(12) United States Patent
Hettler et al.

(10) Patent No.: US 10,564,327 B2
(45) Date of Patent: Feb. 18, 2020

(54) METHOD FOR MANUFACTURING ROD LENSES, AND ROD LENSES

(71) Applicant: SCHOTT AG, Mainz (DE)

(72) Inventors: Robert Hettler, Kumhausen (DE); Frank Gindele, Schweitenkirchen (DE); Edgar Pawlowski, Stadecken-Elsheim (DE)

(73) Assignee: SCHOTT AG, Mainz (DE)

( * ) Notice: Subject to any disclaimer, the term of this patent is extended or adjusted under 35 U.S.C. 154(b) by 598 days.

(21) Appl. No.: 14/597,340

(22) Filed: Jan. 15, 2015

(65) Prior Publication Data

US 2015/0198748 A1    Jul. 16, 2015

(30) Foreign Application Priority Data

Jan. 15, 2014    (DE) .................. 10 2014 100 429

(51) Int. Cl.
| | | |
|---|---|---|
| *G02B 3/00* | (2006.01) | |
| *C03B 19/02* | (2006.01) | |
| *C03B 23/051* | (2006.01) | |
| *C03B 23/04* | (2006.01) | |

(52) U.S. Cl.
    CPC ............ *G02B 3/0031* (2013.01); *C03B 19/02* (2013.01); *C03B 23/04* (2013.01); *C03B 23/051* (2013.01); *G02B 3/0018* (2013.01)

(58) Field of Classification Search
    CPC ....... C03B 19/02; C03B 23/04; C03B 23/051; C03B 23/0026; C03B 23/006; G02B 3/0018; G02B 3/0031
    USPC .......................................... 359/710, 641–642
    See application file for complete search history.

(56) References Cited

U.S. PATENT DOCUMENTS

| | | | | |
|---|---|---|---|---|
| 3,155,748 A | * | 11/1964 | Couri ................ | C03B 23/0026 249/134 |
| 5,048,238 A | * | 9/1991 | Ikeda ................ | B24B 19/226 451/180 |
| 5,626,641 A | * | 5/1997 | Yonemoto ............ | C03B 7/12 65/122 |
| 5,665,135 A | * | 9/1997 | Izumitani ............ | C03B 11/08 428/542.8 |
| 2003/0081897 A1 | * | 5/2003 | Itoh .................. | G02B 3/04 385/34 |

(Continued)

FOREIGN PATENT DOCUMENTS

| | | |
|---|---|---|
| DE | 102012106289 A1 | 1/2014 |
| DE | 102012106290 A1 | 1/2014 |
| JP | H09328319 | 12/1997 |

(Continued)

OTHER PUBLICATIONS

German Office Action dated Oct. 24, 2014 for corresponding German Patent Application No. DE 10 2014 100 429.9 with English translation, 6 pages.

*Primary Examiner* — Joseph P Martinez
*Assistant Examiner* — Vipin Patel
(74) *Attorney, Agent, or Firm* — Ohlandt, Greeley, Ruggiero & Perle, L.L.P.

(57) ABSTRACT

An integral homogeneous rod lens and the manufacturing thereof from a raw glass body are provided by melting the raw glass body in a mold, whereby a protruding part of the raw glass body deforms into a dome shape with a spherical or nearly spherical surface that defines a convex lens portion of the rod lens.

19 Claims, 7 Drawing Sheets

(56) References Cited

U.S. PATENT DOCUMENTS

2010/0327470 A1   12/2010  Protte et al.
2012/0094821 A1*  4/2012  Schenk ................ C03B 23/055
                                                                 501/11

FOREIGN PATENT DOCUMENTS

JP         H1160251      3/1999
KR      101306481 B1   9/2013

* cited by examiner

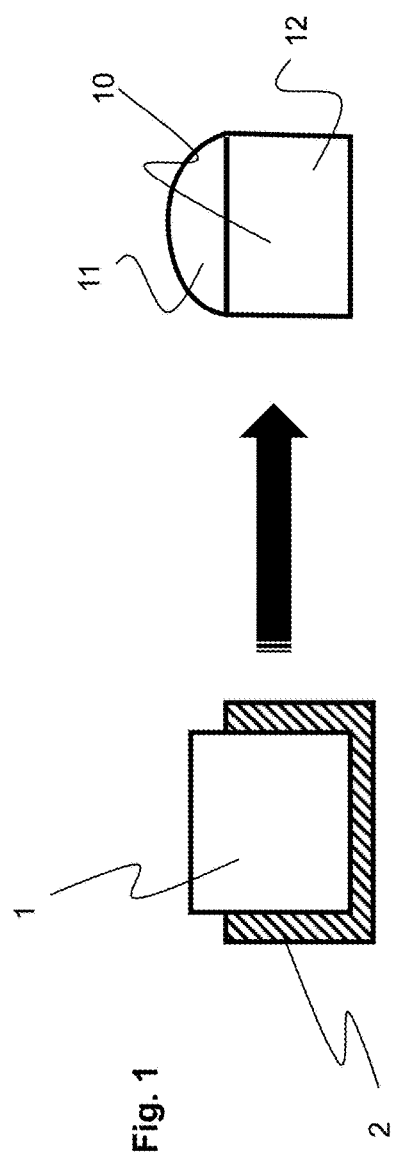
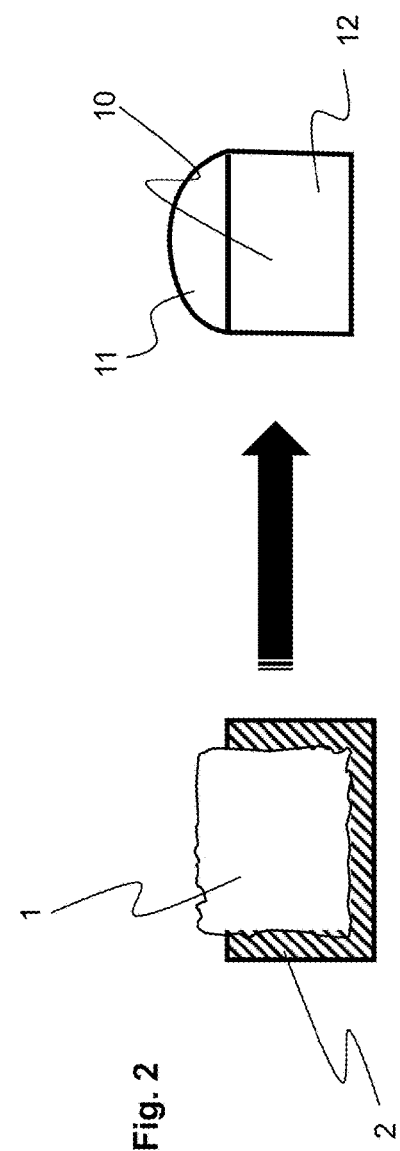

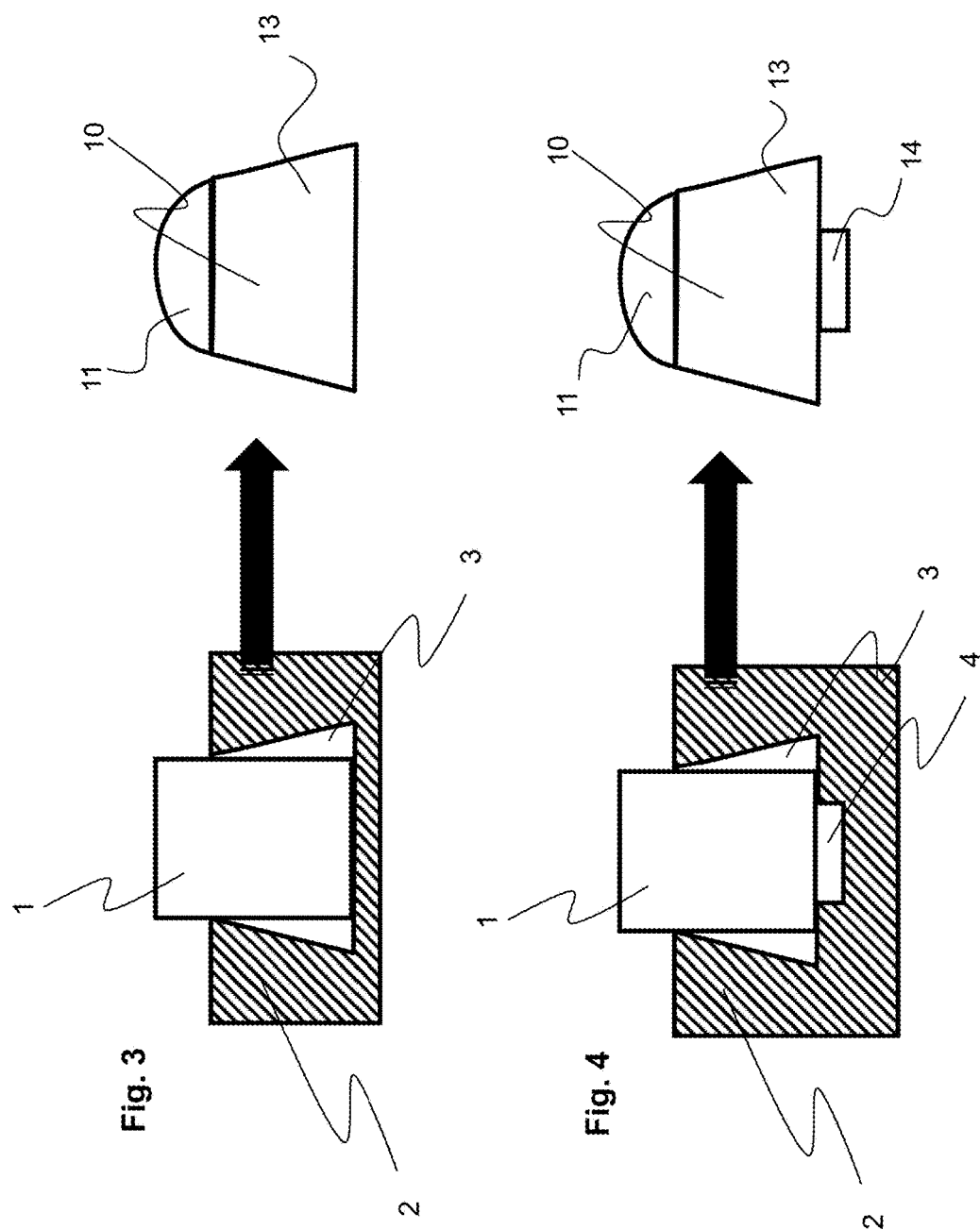

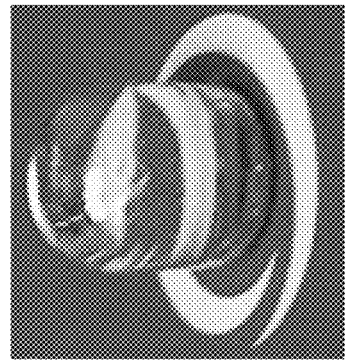
Lens after annealing
- Length 7 mm
- Ø 5.8 mm, lens shaft
- sphere radius : 3 mm
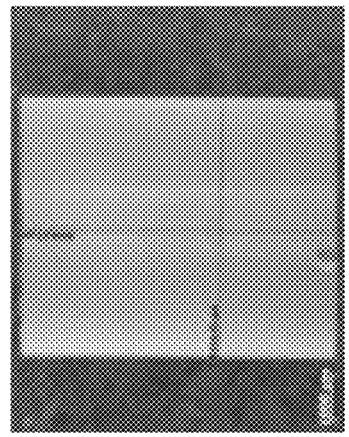
Starting material:
- Length 6.3 mm
- Ø 5.8 mm (rounded)
Fig. 6

METHOD FOR MANUFACTURING ROD LENSES, AND ROD LENSES

CROSS REFERENCE TO RELATED APPLICATIONS

This application claims benefit under 35 U.S.C. § 119(a) of German Patent Application No. 10 2014 100 429.9, filed Jan. 15, 2014, the entire contents of which are incorporated herein by reference.

BACKGROUND

1. Field of the Disclosure

The invention relates to a method for manufacturing rod lenses that are homogeneously integrally formed and each have a shaft portion and a convex lens portion, and further relates to a rod lens produced by the novel method, and to a matrix arrangement of rod lenses.

2. Description of Related Art

Rod lenses are well-known as such, and they have an elongated shaft portion and a lens portion at least on one end of the shaft portion. Such rod lenses are made from preforms by melting these preforms in a pressing mold and deforming them by pressing. Manufacturing in a casting process is also known (US 2010/327470 A).

From KR 101306481 B1, a micro-optical component is known which is built in a substrate and which may be manufactured in form of a component array including micro glass lenses. The substrate has one or more etched cavities, one or more glass blanks are melted on the upper surface of the substrate to fill the one or more cavities, and the substrate is etched on the upper and lower surface to complete manufacturing of the micro glass lenses.

The prior art methods mentioned above suffer from rather elevated manufacturing costs.

SUMMARY

Therefore, an object of the invention is to provide a cost-efficient method for manufacturing high-quality rod lenses. High-quality is to say that low-loss light guidance is enabled in focusing, collimation, and imaging with optical articles such as solar cells, photodetectors, LEDs, optical fibers, and lasers.

Rod lenses have a shaft portion and a convex lens portion at the end of the shaft. In order to exhibit the least possible light loss, such rod lenses according to the invention are homogeneously integrally formed. For manufacturing, raw glass bodies are provided which may have surface roughness. These raw glass bodies are received and supported in appropriate cavities of a mold so that a portion of each raw glass body protrudes from the mold. This portion of the raw glass body is intended to define the lens portion of the rod lens after processing. The processing of the raw glass body is accomplished by melting at such a temperature that the portion of the raw glass body protruding from the mold deforms in an air or gas environment into a dome shape having a spherical or nearly spherical surface. This deformation is caused by the surface forces at the protruding liquid end of the raw glass body in a manner so that the free glass surface assumes a minimum size. Once this occurred, the rod lens is allowed to cool, usually in a Lehr or an annealing furnace for extended periods of time, so as to prevent any formation of shrinkage stresses and streaks within the rod lens. Thereafter, the rod lens is removed from the mold.

The rod lens so produced is homogeneously integrally formed, i.e. in one piece, with its shaft portion and lens portion. The lens portion has a spherical or nearly spherical surface of fire-polished quality. Fire-polished quality means that surface roughness is extremely low. For example, (random) root mean square roughness is 0.1 µm, (random) average roughness is 80.5 nm, and peak-to-valley roughness is 398 nm.

The shaft portion may have a prismatic or round cylindrical shape with a constant rod cross section. However, it is also possible that the shaft portion has a truncated pyramidal shape, optionally even with a hexagonal base, or a truncated cone shape. In such a case, the rod lens has a tapering cross section or an enlarging cross section.

To facilitate removal of the rod lens from the mold it is advantageous if the material of the mold has a thermal expansion coefficient that is smaller than the thermal expansion coefficient of the rod lens produced. Thus, during cooling the rod lens produced will contract more than the mold.

Instead of one-piece molds, two-piece or multi-piece molds may be used, which especially comes into consideration when rod lenses are to be produced, which have an enlarging cross section as seen from the lens portion towards the base of the shaft portion.

For the material of the mold, graphite, ceramics, glass, glass ceramics, and metal are contemplated.

BRIEF DESCRIPTION OF THE DRAWINGS

Exemplary embodiments of the invention will now be described with reference to the drawings. In the drawings:

FIG. 1 illustrates the principle of manufacturing of the rod lens;

FIG. 2 illustrates manufacturing based on a rough starting glass body;

FIG. 3 shows manufacturing of a rod lens having a shaft with the shape of a truncated pyramid;

FIG. 4 shows manufacturing of a rod lens similar to that of FIG. 3, but with a foot;

FIG. 6 shows photographs of a raw glass body as the starting material and of a produced rod lens after annealing;

DETAILED DESCRIPTION

Figure 5:
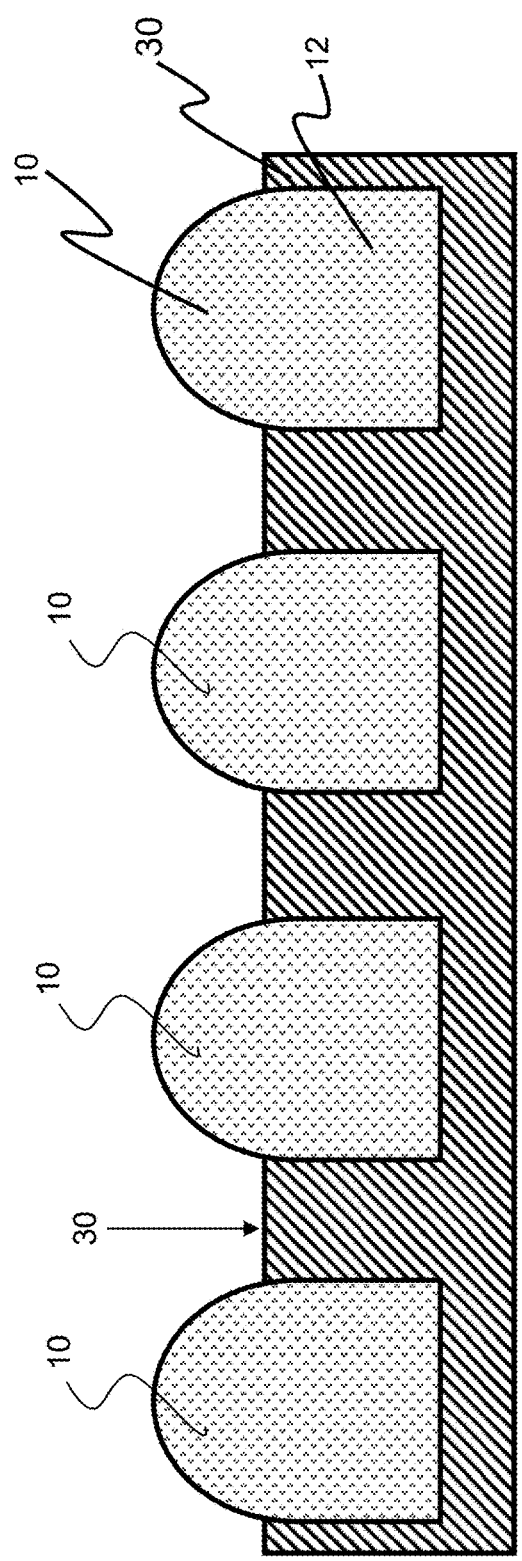
FIG. 5 shows a rod lens array in a matrix arrangement.

Starting from a raw glass body 1, FIG. 1 schematically illustrates the manufacturing of a rod lens 10 having a convex lens portion 11 and a shaft portion 12. A raw glass body 1 is inserted into a cavity of a mold 2 in a manner so that a portion of the raw glass body projects from the mold, which portion will define the lens portion 11 after manufacturing. The manufacturing of rod lens 10 from raw glass body 1 is effected by heat treatment within mold 2, and that at such a temperature that the raw glass body 1 melts and gets the opportunity to assume its minimum body surface. Accordingly, a spherical dome shape with spherical or nearly spherical surface is being formed. The surface quality of this spherical surface is extremely high, it is referred to as a fire-polished quality.

During its generation the rod lens is supported by mold 2, while it is still doughy/liquid. In order to avoid stress cracks and streaks, the rod lens which is still hot is allowed to cool slowly, which is usually accomplished in a Lehr or annealing furnace. During cooling, both the rod lens 1 and the mold 2 are shrinking, but the latter much less than the rod lens, which is achieved by the fact that the material of the mold 2 has a smaller coefficient of thermal expansion than that of the rod lens 10. Therefore, once the finished rod lens 10 has sufficiently cooled, it can be easily removed from the cavity of mold 2.

FIG. 2 shows a raw glass body 1 that has some surface roughness, such as caused when the raw glass body is cut from a block. Some roughness also remains from grinding. When such a raw glass body 1 is inserted into the cavity of mold 2, some air will remain between the surface of the raw glass body 1 and the inner surface of mold 2. However, when the raw glass body 1 melts it expands until reaching the wall of mold 2 and usually displaces the trapped air. Therefore, the shaft portion 12 will assume a surface finish that corresponds to the surface quality of the mold 2. Independently therefrom, the surface quality of lens portion 11 is defined by skin formation relative to the ambient air or ambient gas, which results in a nearly spherical surface.

FIG. 3 shows the manufacturing of a rod lens 10 having a shaft portion 13 that enlarges in cross section. This shaft portion 13 may have the shape of a truncated pyramid, optionally also with a hexagonal base, but a truncated cone shape is likewise possible. Mold 2 is adapted to the shape of the rod lens and initially has a free space 3 that is filled when the raw glass body 1 is melting, and which free space is some kind of an undercut in terms of the tool shape. Therefore, the mold will be made in two or more parts to allow the finished rod lens to be removed from the mold more easily.

FIG. 4 shows a variation of the embodiment of FIG. 3, in which the cavity of mold 2 additionally has a wall recess 4, into which a foot 14 of the rod lens 10 may pour. Such a foot 14 may be particularly useful for fastening purposes.

FIG. 5 shows a matrix arrangement of rod lenses 10 forming an array and being anchored with their shaft portions 12 in a holder 30.

FIG. 6 shows a result of the method for manufacturing rod lenses from a raw glass body. The starting material had a length of 6.3 mm and a diameter of 5.8 mm. After annealing, the rod lens had a length of 7 mm, with a diameter of 5.8 mm of the shaft portion. The radius of the spherical surface was 3 mm.

Figure 7:
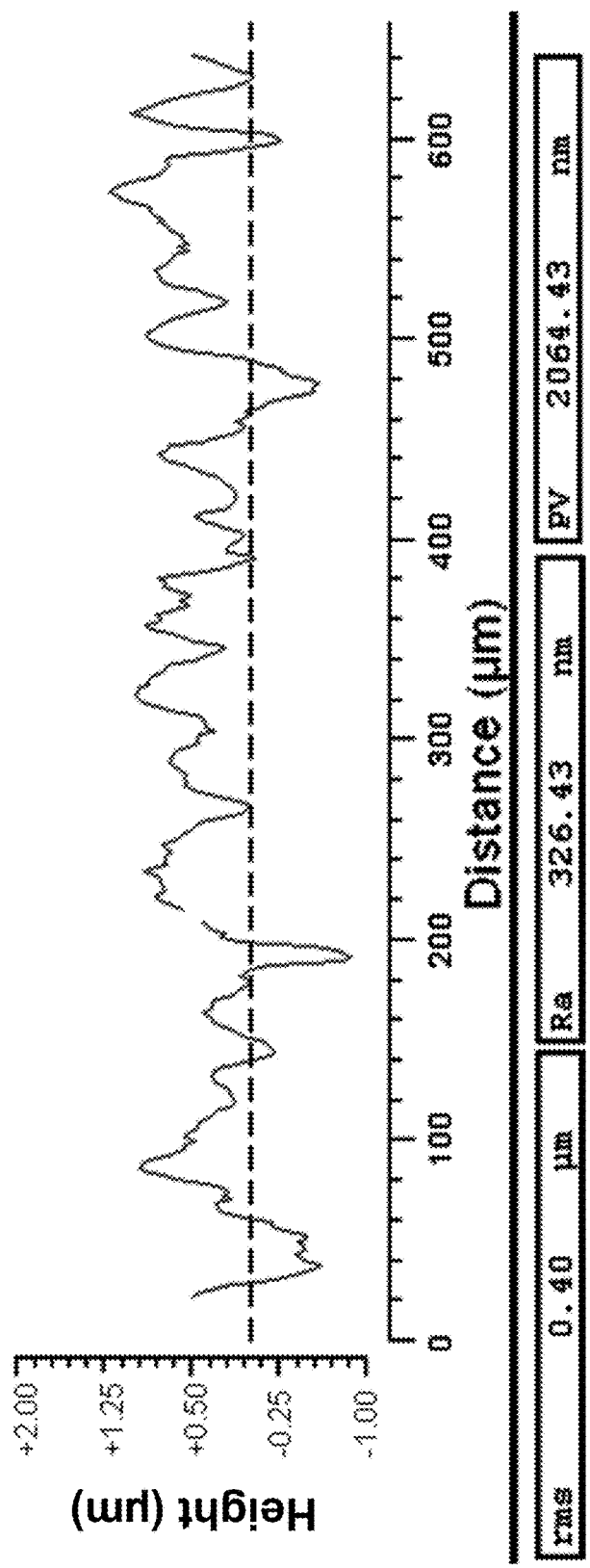
FIG. 7 is a graph of the surface roughness of a raw glass body.

FIG. 7 shows a graph of the roughness measured on the surface of the starting material. From the graph, a (random) root mean square (rms) roughness of 0.40 µm, a (random) average roughness (Ra) of 326.43 nm, and a peak-to-valley (PV) roughness of 2064.43 nm can be derived. The measured values were obtained using a white light interferometer.

Figure 8:
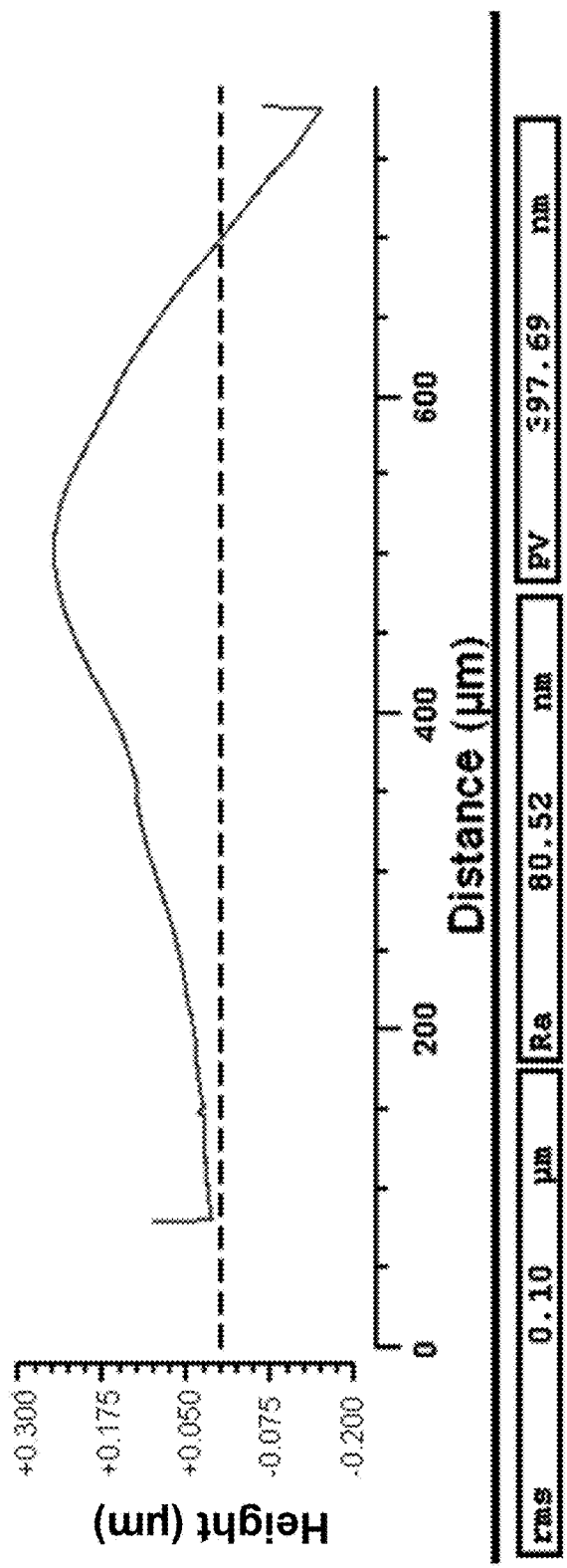
FIG. 8 is a graph of the roughness of the rod lens surface.

FIG. 8 shows the roughness as measured on the surface of a rod lens, as determined using a white light interferometer. The (random) root mean square (rms) roughness is 0.10 µm, the (random) average roughness (Ra) is 80.52 nm, and the peak-to-valley roughness (PV) is 397.69 nm.

Figure 9:
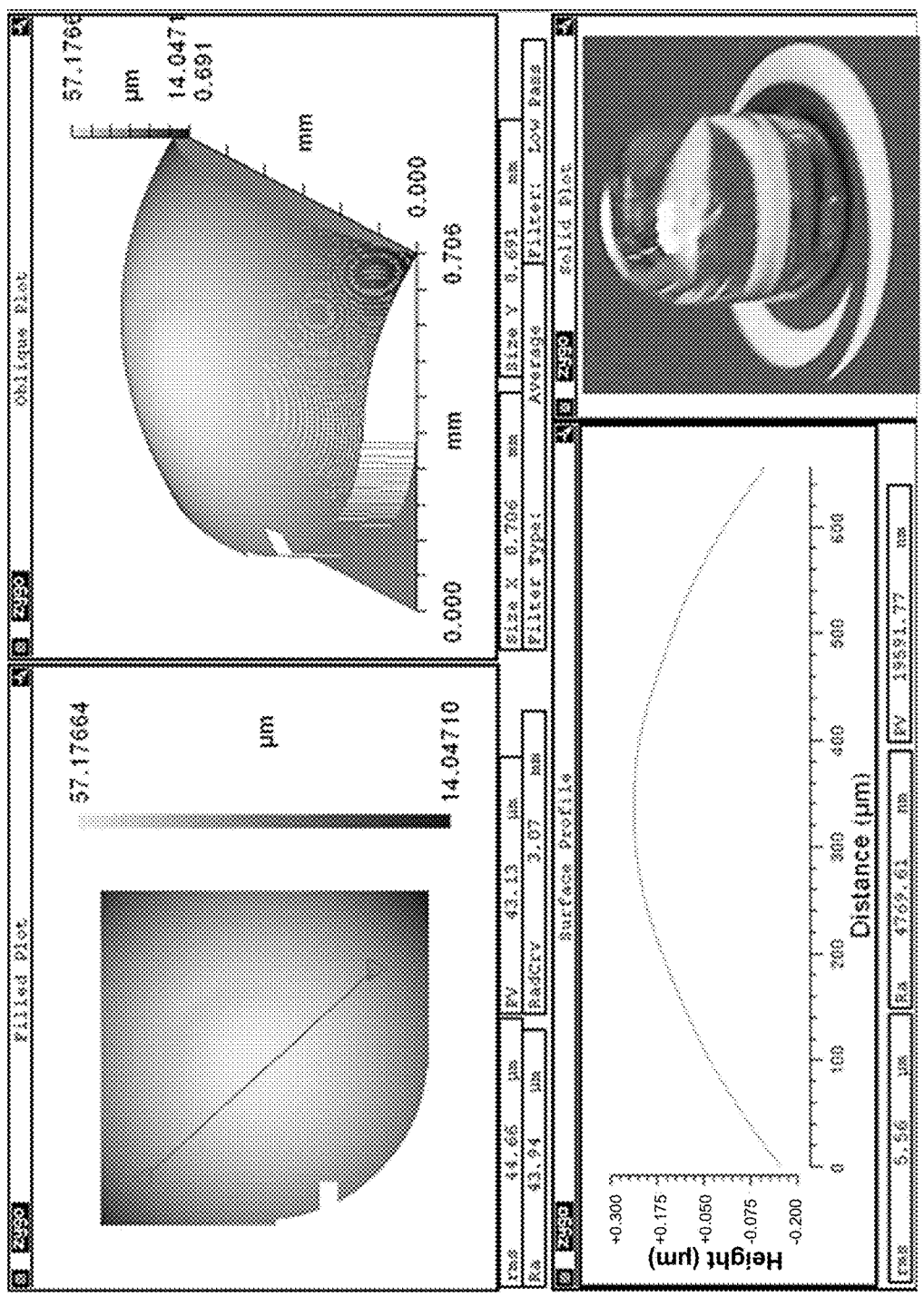
FIG. 9 are illustrations of the surface contour of a rod lens.

FIG. 9 shows illustrations of the surface contour of a lens as determined using a white light interferometer. The sphere surface has a radius of 3 mm.

What is claimed is:

1. A method for manufacturing a rod lens that is homogeneously integrally formed with a shaft portion and a convex lens portion, comprising the steps of:
   providing at least one raw glass body from which the rod lens is to be formed;
   providing a mold for receiving and supporting the raw glass body such that the portion of the raw glass body intended to define the convex lens portion protrudes from the mold;
   melting the raw glass body at such a temperature that the portion of the raw glass body protruding from the mold deforms in air or in gas into a dome shape having a spherical surface;
   allowing the rod lens so produced to cool; and
   removing the rod lens from the mold.

2. The method as claimed in claim 1, wherein the step of providing the mold comprises providing a two-piece mold.

3. The method as claimed in claim 1, wherein the step of providing the mold comprises providing a multi-piece mold.

4. The method as claimed in claim 1, wherein the mold is made of a material selected from a group consisting of graphite, ceramics, glass, glass ceramics, and metal.

5. The method as claimed in claim 4, wherein the material has a coefficient of thermal expansion that is smaller than a coefficient of thermal expansion of the raw glass body so that the rod lens detaches from the mold during cooling.

6. A rod lens produced by the method as claimed in claim 1, wherein the shaft portion and the lens portion are homogeneously integrally formed and wherein the spherical surface has fire-polished quality.

7. The rod lens as claimed in claim 6, wherein the shaft portion has a prismatic shape with a constant rod cross section.

8. The rod lens as claimed in claim 6, wherein the shaft portion has a cylindrical shape with a constant rod cross section.

9. The rod lens as claimed in claim 6, wherein the shaft portion has a truncated pyramidal shape.

10. The rod lens as claimed in claim 9, wherein the truncated pyramidal shape has a hexagonal base.

11. The rod lens as claimed in claim 6, wherein the shaft portion has a truncated cone shape.

12. A matrix arrangement of rod lenses as claimed in claim 6.

13. A rod lens comprising a shaft portion and a convex lens portion that are homogeneously integrally formed with one another, wherein the convex lens portion is defined by skin formation relative to ambient air or gas into a dome shape having a spherical surface of fire-polished quality.

14. The rod lens as claimed in claim 13, wherein the shaft portion has a prismatic shape with a constant rod cross section.

15. The rod lens as claimed in claim 13, wherein the shaft portion has a cylindrical shape with a constant rod cross section.

16. The rod lens as claimed in claim 13, wherein the shaft portion has a truncated pyramidal shape.

17. The rod lens as claimed in claim 16, wherein the truncated pyramidal shape has a hexagonal base.

18. The rod lens as claimed in claim 13, wherein the shaft portion has a truncated cone shape.

19. A method for manufacturing a rod lens that is homogeneously integrally formed with a shaft portion and a convex lens portion, comprising the steps of:
   inserting a raw glass body into a mold so that air or gas remains between an inner surface of the mold and a first region of the raw glass body intended to form the shaft portion and so that a second region of the raw glass body intended to form the convex lens portion extends from the mold above the inner surface;
   melting the raw glass body until the second region contacts the inner surface so that the shaft portion has a surface finish that corresponds to a surface quality of the inner surface and until the first region of the raw glass body defines a surface quality of the convex lens portion by skin formation relative to ambient air or gas; allowing the rod lens so produced to cool; and removing the rod lens from the mold.

\* \* \* \* \*